Oct. 25, 1927.
E. C. LUNSFORD
1,646,587
BRAKE BEAM SUPPORTING BOLT
Filed Jan. 20, 1927
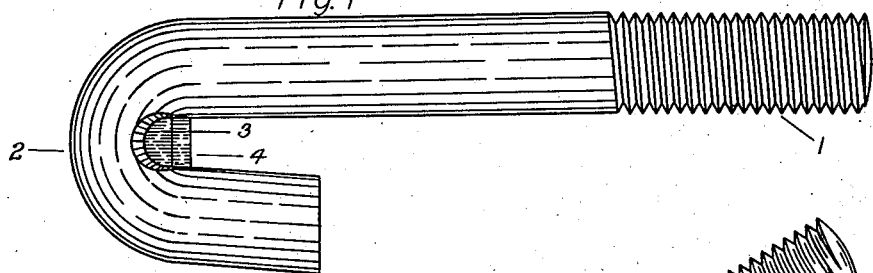
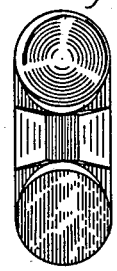
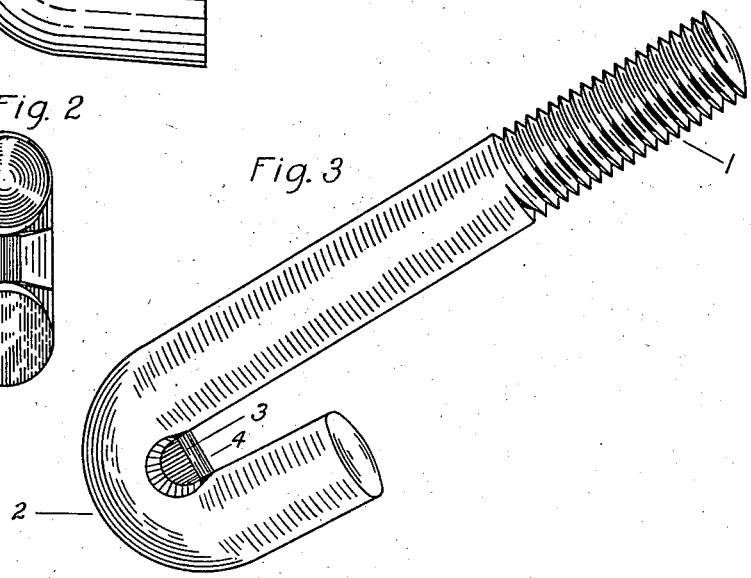
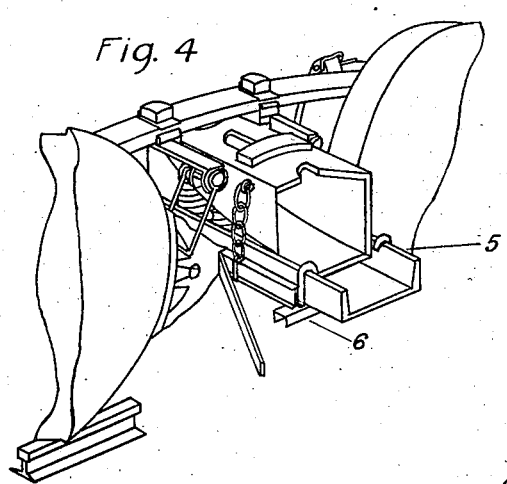
Inventor
Emele Carroll Lunsford.
per
Attorney Patented Oct. 25, 1927.

1,646,587

UNITED STATES PATENT OFFICE.

ERRELL CARROLL LUNSFORD, OF SHREVEPORT, LOUISIANA.

BRAKE-BEAM-SUPPORTING BOLT.

Application filed January 20, 1927. Serial No. 162,366.

The invention relates to a construction of bolt used in conjunction with brake beam supports on railway trucks and the object of the bolt is, first, to provide a quick means to fasten the support to the spring plank of the railway truck, thereby saving a great deal of labor; second, to eliminate the necessity of riveting the support to the spring plank heretofore required; and third, to afford a quick means for loosening the support from the spring plank.

One form of the invention is illustrated in the accompanyng drawing, in which Fig. 1, is a plan view of the bolt; Fig. 2, a view in elevation; Fig. 3, a detailed view in perspective; and Fig. 4, a view in perspective showing how the bolts are used on a railway truck.

The bolt has a standard thread 1, as shown in Figs. 1 and 3, on one end and the other end is turned up making a U-bend 2. Between the U-bend the bolt is pinched in at 3 and the edge is filed making a V-shaped knife edge 4. The knife edge is case-hardened or tempered, depending upon the material from which the bolt is made. Case-hardening or tempering gives the bolt longer wearing quality.

Four bolts are required for each railway truck. Fig. 4 shows where the bolts are used. A V-shaped notch is cut into the spring plank at 5 and the V-shaped knife edge of the bolt slips into the notch cut into the spring plank and a channel or angle iron 6 with two holes is fastened under the spring plank by lock-nuts attached to the thread of the bolt. The notch cut in the spring plank prevents the bolts from slipping thus causing a rigid and steady support for the brake beam.

I am aware that prior to my invention brake beam supports have been fastened by means of screws, rivets, and bolts but these arrangements have not been satisfactory for permitting a quick installation or removal of the brake beam support.

I claim:

1. A bolt member for attachment to a beam comprising a screw threaded shank, a J-shaped head on said shank and a knife edge positioned between the underside of said J-shaped head and said shank for preventing longitudinal movement of said bolt member along said beam.

2. A bolt member for attachment to a beam comprising a screw threaded shank, a J-shaped head on said shank, said head being flattened adjacent the junction thereof with said shank, said flattened portion being provided with a biting edge extending between said J-shaped head and said shank for preventing longitudinal displacement of said bolt member with respect to said beam.

3. A bolt member for attachment to a support comprising a circular rod member bent substantially in the shape of a J, screw threads on one end of said rod member, a flattened notch between the head of said bolt and the screw threaded portion of said rod and a V-shaped biting edge formed on said notch for preventing longitudinal movement of said bolt with respect to a support.

ERRELL CARROLL LUNSFORD.